United States Patent
Chang et al.

(10) Patent No.: US 10,824,910 B2
(45) Date of Patent: Nov. 3, 2020

(54) IMAGE PROCESSING METHOD, NON-TRANSITORY COMPUTER READABLE STORAGE MEDIUM AND IMAGE PROCESSING SYSTEM

(71) Applicant: HTC Corporation, Taoyuan (TW)

(72) Inventors: Fu-Chieh Chang, Taoyuan (TW); Chun-Nan Chou, Taoyuan (TW); Edward Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 230 days.

(21) Appl. No.: 15/970,901

(22) Filed: May 4, 2018

(65) Prior Publication Data
US 2018/0322367 A1 Nov. 8, 2018

Related U.S. Application Data

(60) Provisional application No. 62/501,100, filed on May 4, 2017.

(51) Int. Cl.
*G06K 9/62* (2006.01)
*G06K 9/46* (2006.01)

(52) U.S. Cl.
CPC ......... *G06K 9/6259* (2013.01); *G06K 9/4604* (2013.01); *G06K 9/4652* (2013.01); *G06K 9/6202* (2013.01); *G06K 9/627* (2013.01); *G06K 9/6262* (2013.01)

(58) Field of Classification Search
CPC .. G06K 9/4604; G06K 9/4652; G06K 9/6202; G06K 9/6259; G06K 9/6262; G06K 9/627
See application file for complete search history.

(56) References Cited

U.S. PATENT DOCUMENTS

2018/0322679 A1* 11/2018 Kunkel .............. H04N 21/4122

FOREIGN PATENT DOCUMENTS

| CN | 102055873 A | 5/2011 |
|---|---|---|
| CN | 106339997 A | 1/2017 |
| CN | 106548208 A | 3/2017 |
| EP | 0936682 A1 | 8/1999 |

OTHER PUBLICATIONS

Kwak, Hanock, and Byoung-Tak Zhang. "Generating images part by part with composite generative adversarial networks." arXiv preprint arXiv:1607.05387 (2016). (Year: 2016).*
Corresponding Chinese office action dated Jun. 9, 2020.

* cited by examiner

*Primary Examiner* — Nirav G Patel
(74) *Attorney, Agent, or Firm* — CKC & Partners Co., LLC

(57) ABSTRACT

An image processing training method includes the following steps. A template label image is obtained, in which the template label image comprises a label corresponding to a target. A plurality of first reference images are obtained, in which each of the first reference images comprises object image data corresponding to the target. A target image according to the template label image and the first reference images is generated, in which the target image comprises a generated object, a contour of the generated object is generated according to the template label image, and a color or a texture of the target image is generated according to the first reference images.

20 Claims, 13 Drawing Sheets

IMAGE PROCESSING METHOD, NON-TRANSITORY COMPUTER READABLE STORAGE MEDIUM AND IMAGE PROCESSING SYSTEM

RELATED APPLICATIONS

This application claims priority to Provisional U.S. Application Ser. No. 62/501,100 filed May 4, 2017, which is herein incorporated by reference.

BACKGROUND

Technical Field

The present disclosure relates to an image processing method, a non-transitory computer readable storage medium and an image processing system. More particularly, the present disclosure relates to train an image processing model to generate a labeled image from an input image.

Description of Related Art

With the rapid development of machine learning, it is a nightmare for researchers to search or create the huge amount of labeled data. It is laborious and time-consuming.

Therefore, how to solve the issue is very important nowadays.

SUMMARY

The disclosure provides an image processing method. The image processing method includes the following steps. A template labeled image is obtained, in which the template label image comprises a label corresponding to a target. A plurality of first reference images is obtained, in which each of the first reference images comprises object image data corresponding to the target. A target image according to the template label image and the first reference images is generated, in which the target image comprises a generated object, a contour of the generated object is generated according to the template label image, and a color or a texture of the target image is generated according to the first reference images.

The disclosure also provides a non-transitory computer readable storage medium with a computer program. The computer program is configured to execute aforesaid image processing method.

The disclosure also provides an image processing system. The image processing system includes a memory and a processor. The memory is coupled to the processor, and is configured to store a template label image, in which the template label image comprises a label corresponding to a target. A processor is operable to obtain a plurality of first reference images, in which each of the first reference images comprises object image data corresponding to a target. The processor is further operable to generate a target image according to the template label image and the first reference images, in which the target image comprises a generated object, a contour of the generated object is generated according to the template label image, and a color or a texture of the target image is generated according to the first reference images.

Through the operations of one embodiment described above, a large volume of pixel-wise labeled image can be automatically generated by using the image processing system to achieve high accuracy when doing the task of object segmentation or segmenting an object out of an image.

It is to be understood that both the foregoing general description and the following detailed description are demonstrated by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
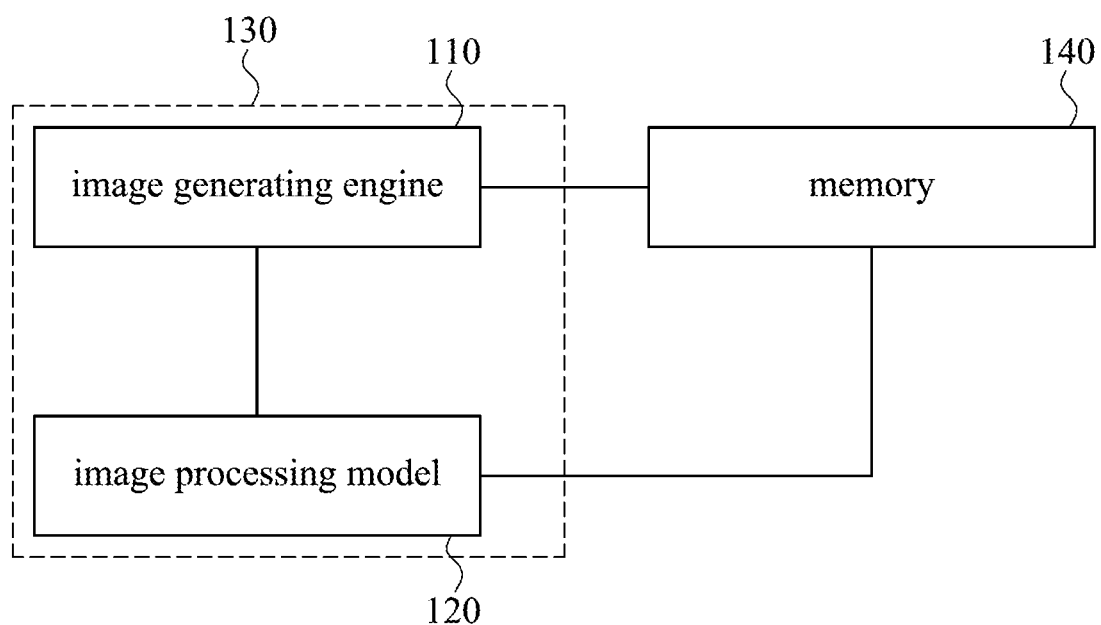
FIG. 1 is a schematic diagram illustrating an image processing system according to an embodiment of the disclosure.

Reference will now be made in detail to the present embodiments of the disclosure, examples of which are illustrated in the accompanying drawings. Wherever possible, the same reference numbers are used in the drawings and the description to refer to the same or similar parts.

It will be understood that, although the terms first, second, third etc. may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present disclosure.

Reference is made to FIG. 1, which is a schematic diagram illustrating an image processing system 100 according to an embodiment of the disclosure. The image processing system 100 includes a processor 130 and a memory 140, in which the processor 130 is coupled to the memory 140.

In some embodiments, the memory 140 is configured to store a plurality of reference images (e.g., real images captured by a camera) and template label image, and to provide the reference images and template label image to the processor 130. In some embodiments, the reference images can be real images captured by a camera. For example, the real images are filmed by a photographer regarding a real scene, or collected from an image database.

In some embodiments, the template label image can be obtained from a three-dimension (3D) model, a camera, a generator of a learning model or depicted by hand. For example, if the template label image contains hands with a white color and background with a black color, the template label image can be generated from projecting 3D hand models onto a 2D image, capturing hands wearing white gloves with black background by a camera, or a generator of the learning model with inputting labeled image, in which the inputted labeled image consists of hands with a white color and a background with a black color.

In some embodiments, the memory 140 can be realized by, for example, a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art.

In some embodiments, the processor 130 is configured to run or execute various software programs and/or sets of instructions to perform various functions to process data. In some embodiments, the processor 130 is configured to fetch the image stored in the memory 140 or fetch the image directly from a camera (not shown) and to generate a processed image based on the original image. In detail, the processor 130 is configure to process an input image without labels to generate a labeled image (i.e., target image) according to objects and a background in the input image, in which the labeled image contains several labels related to the objects and the background respectively. In some embodiments, the processor 130 can be realized by, for example, one or more processors, such as central processors and/or microprocessors, but are not limited in this exemplar.

In some embodiments, the processor 130 includes an image generating engine 110 and an image processing model 120. The image generating engine 110 is coupled to the image processing model 120, and both the image generating engine 110 and the image processing model 120 are coupled to the memory 140 respectively.

In some embodiments, the image generating engine 110 is configured for capturing a data distribution of real images without labels and generating labeled images (i.e., target images) corresponding to the template label images, in which the target image should be almost the same as real images, according to template label images and real images. A pair of template label image and its corresponding target image is supplied to the image processing model 120. The template label image, which is represented by a color mask. In some embodiments, the color mask consists of pixels of specific colors, and these colors indicate which pixels in the labeled image belong to a segmented object or not.

In some embodiments, the image generating engine 110 can be realized by software programs, firmware and/or hardware circuits based on a learning model (e.g., a generative adversarial network (GAN) model). Various learning models that can generate images similar to real images inputted to the learning models are within the contemplated scope of the present disclosure.

In some embodiments, the image processing model 120 is configured for processing an input image without labels and generating a label of the input image. In other words, the image processing model 120 is configured to do the image segmentation for generating a label image according to a background and an object in the input image, in which the label image includes a first label related to the object and a second label related to the background.

Figure 2:
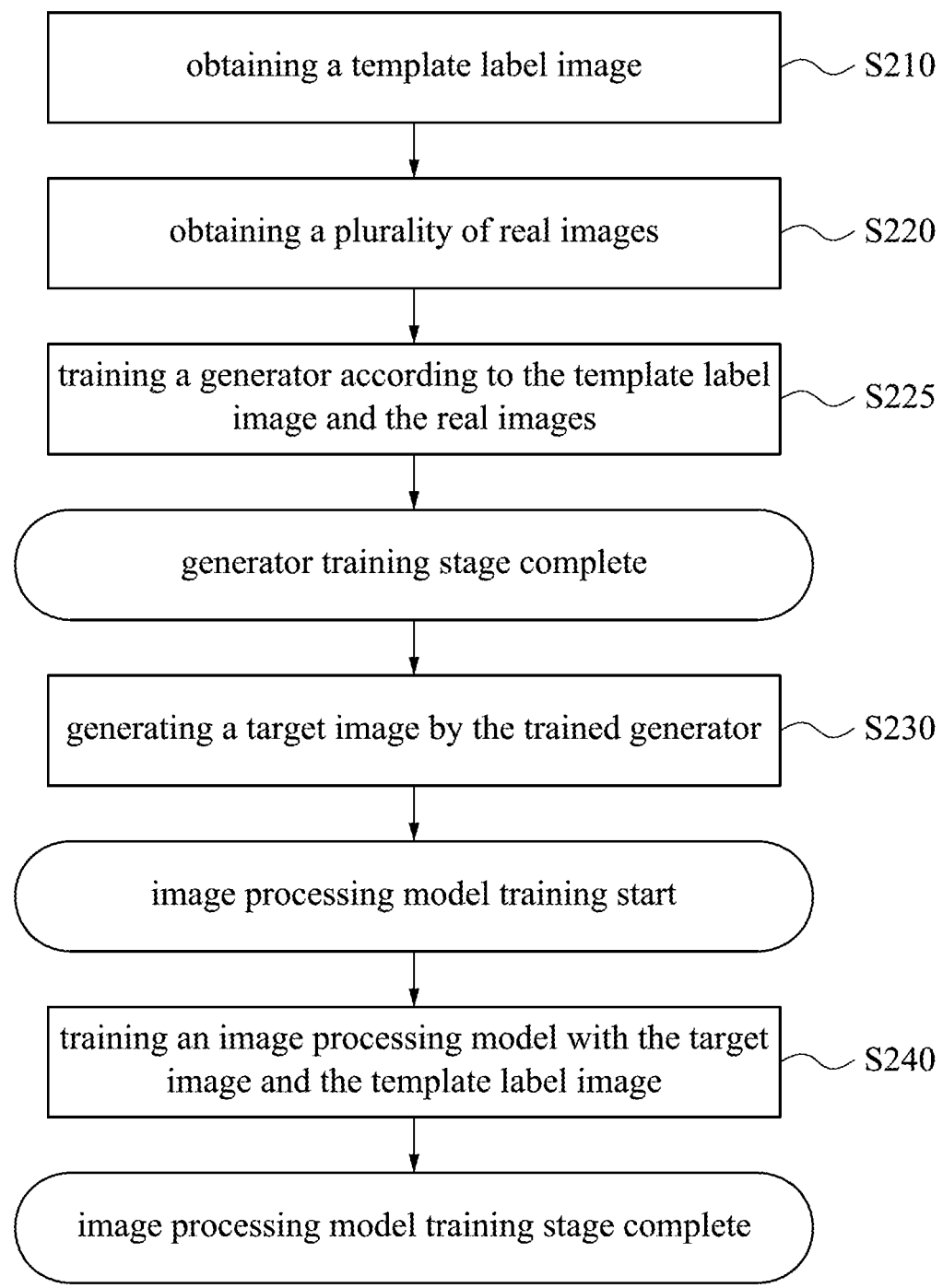
FIG. 2 is a flowchart of an image processing method of the image processing system in FIG. 1, in accordance with one embodiment of the present disclosure.
Figure 3:
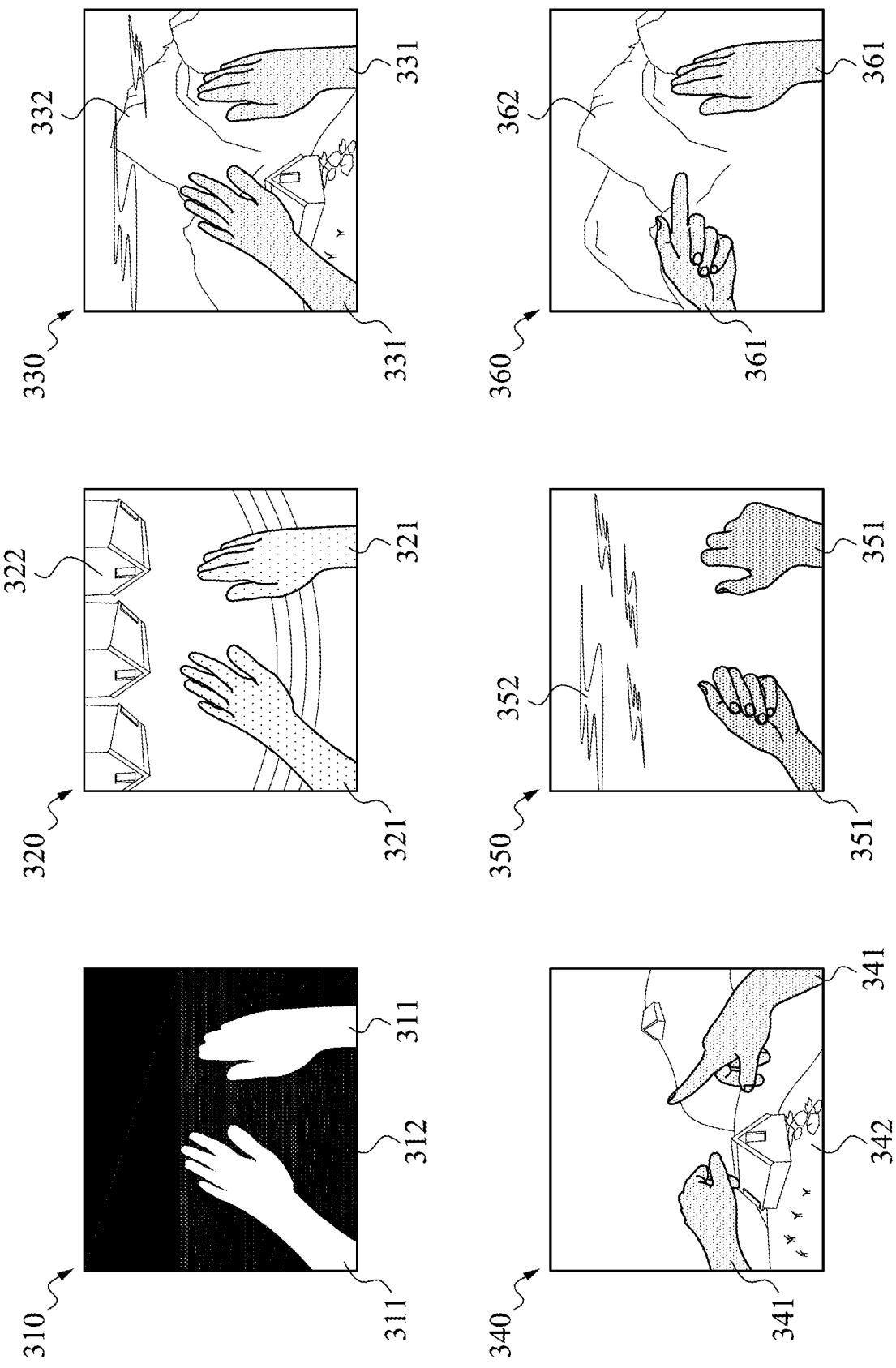
FIG. 3 is a schematic diagram illustrating the image processing method in a demonstrational example.

Reference is made to FIG. 1, FIG. 2 and FIG. 3. Details of the present disclosure are described in the paragraphs below with reference to the image processing method in FIG. 2, in which FIG. 2 is a flowchart of the image processing method 200 of the image processing system 100 in FIG. 1, in accordance with one embodiment of the present disclosure. FIG. 3 is a schematic diagram illustrating the image processing method 200 in a demonstrative example. However, the present disclosure is not limited to the embodiment below.

It should be noted that, in some embodiments, the image processing method 200 may be implemented as a computer program. When the computer program is executed by a computer, an electronic device, or the processor 130 in FIG. 1, this executing device performs the image processing method 200.

In addition, it should be noted that in the operations of the following image processing method 200, no particular sequence is required unless otherwise specified. Moreover, the following operations also may be performed simultaneously or the execution times thereof may at least partially overlap.

Furthermore, the operations of the following image processing method 200 may be added to, replaced, and/or eliminated as appropriate, in accordance with various embodiments of the present disclosure.

In operation S210, the image generating engine 110 obtains a template label image 310 from the memory 140. In some embodiments, the template label image 310 contains a label associated with an object contour of a target (i.e., hands). For example, the target can be realized by hands, a pen, a book and etc. As shown in FIG. 3, the template label image 310 contains two labels, a first label 311 (i.e., an area within the object contour of the target) and a second label 312 (i.e., an area outside the object contour of the target), in which the first label 311 is filled with white color and the second label 312 is filled with black color.

In operation S220, the image generating engine 110 obtains a plurality of real images 340, 350 and 360 from the memory 140. In some embodiments, the real images 340, 350 and 360 must contain objects with the same target (i.e., hands), such that the image generating engine 110 can generate images similar to the template label image 310. As shown in FIG. 3, the real image 340 contains object image data 341 (i.e., hands) and background image data 342 (i.e., a house), the real image 350 contains object image data 351 (i.e., hands) and background image data 352 (i.e., clouds), the real image 360 contains object image data 361 (i.e., hands) and background image data 362 (i.e., mountains), in which the object image data 341, 351 and 361 are hands with different color, texture, gesture and shape. In this embodiment, the memory 140 contains, but not limited to, three real images 340, 350 and 360. The memory 140 contains more real images can generate better results.

In operation S225, the image generating engine 110 is trained according to training data. In some embodiments, the training data used to train the image generating engine 110 includes the template label image and the real images. The image generating engine 110 is trained by the training data to be able to generate a pair of a target image and the template label image. The target image is desired to be similar to the real images. Details about how to train the image generating engine 110 will be explained in following paragraphs.

In operation S230, the image generating engine 110 after training is able to generate a target image 330. In an embodiment, the image generating engine 110 generates the target image 330 according to the template label image 310 and the real images 340, 350 and 360. In one embodiment, the image generating engine 110 generates, but not limited to, one hundred target images according to the template label image and the real images. Various numbers of target images generated according to the template label image and the real images by the image generating engine 110 are within the contemplated scope of the present disclosure.

In some embodiments, the target image 330 contains a generated object 331, in which an object contour of the generated object 331 is generated according to the template label image 310, and a color or a texture of the target image 330 is generated according to the real images 340, 350 and 360. In this operation, the image generating engine 110 uses several steps to generate the target image 330, in which these steps will be discussed below in FIG. 4 and FIG. 5.

In operation S240, the image generating engine 110 trains the image processing model 120 with the target image 330 and the template label image 310, such that the image processing model 120 can convert an input image without labels into an image with labels. In some embodiments, the image processing model 120 can be realized by software programs, firmware and/or hardware circuits based on a learning model.

In some embodiments, the learning model may use an approach which combines of a Conditional Random Field (CRF) method and an image classification method. Various learning models are within the contemplated scope of the present disclosure.

Figure 4:
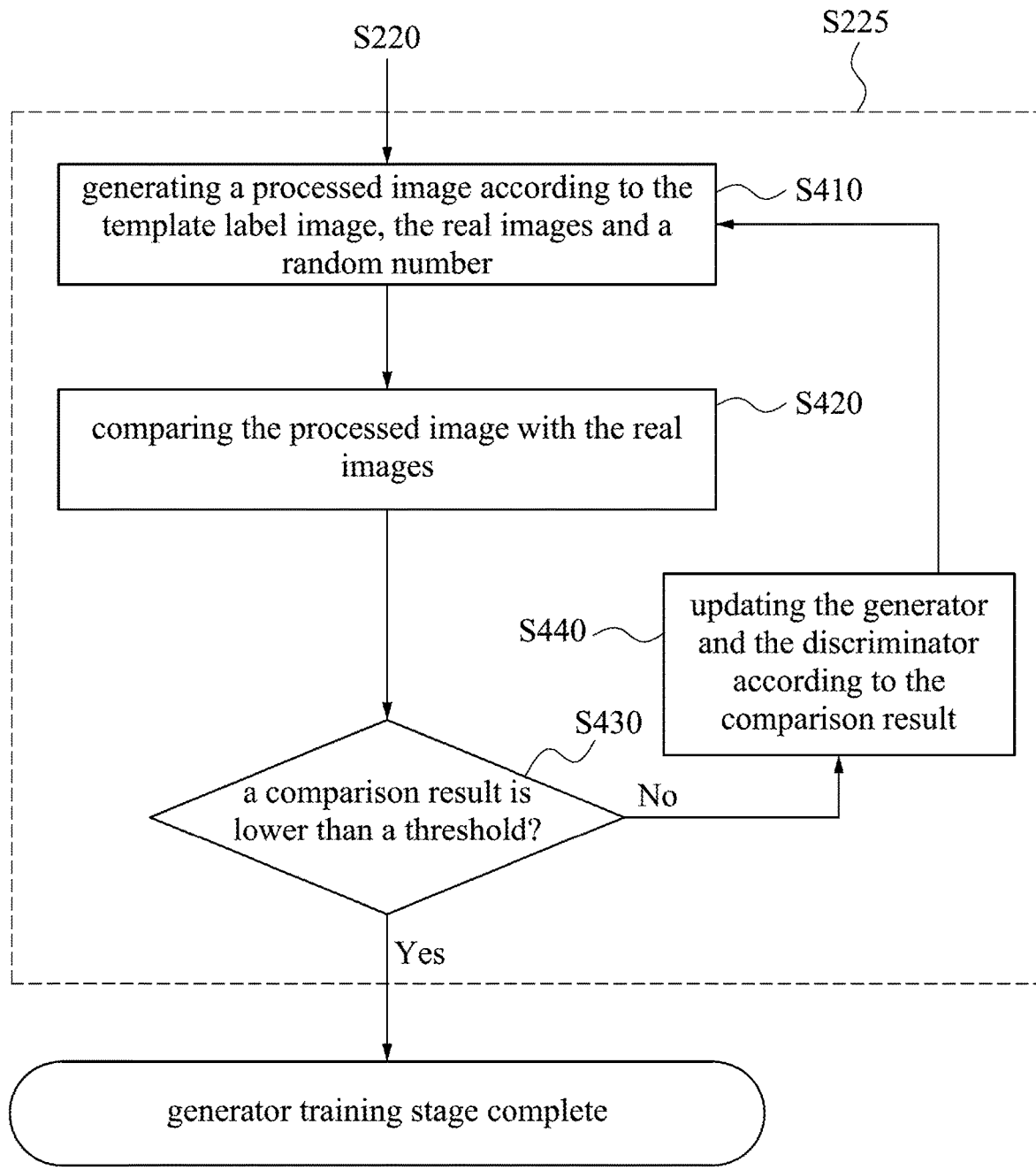
FIG. 4 is a partial flowchart of an image processing method in FIG. 2, in accordance with one embodiment of the present disclosure.

Reference is made to FIG. 1, FIG. 3 and FIG. 4. FIG. 4 is a partial flowchart illustrating further operations within the operation S225 in an image processing method 200 in FIG. 2, in accordance with one embodiment of the present disclosure.

In some embodiments, the image generating engine 110 includes a generator and a discriminator, in which the generator is configured for generating a processed image 320 according to the template label image 310, and the discriminator is configured for determining whether the processed image 320 is sufficiently similar to the real images 340, 350 and 360 and updating the generator according to the result. In some embodiments, the generator can be realized by, but not limited to, an image-to-image translation model.

In operation S410, the image generating engine 110 generates a processed image 320 according to the template label image 310 and the real images 340, 350 and 360 and a random number. In this operation, the generator of the image generating engine 110 generates the processed image 320 with a generated object 321 (i.e., hands) and a generated background 322.

In some embodiments, the random number is supplied to the generator of the image generating engine 110 in order to generate different processed image 320 with the template label image 310 and the real images 340, 350 and 360.

In operation S420, the image generating engine 110 compares the processed image 320 with the real images 340, 350 and 360. In some embodiments, the discriminator of the image generating engine 110 compares a color, a texture or a content-object shape of the processed image 320 with the real images 340, 350 and 360. In some embodiments, after the discriminator of the image generating engine 110 determines that the color and the texture of the processed image 320 are similar to the real images 340/350/360, the discriminator of the image generating engine 110 compares the shape of the content-object shape of the processed image 320 to the content-object shape of the real images 340/350/360.

After the discriminator of the image generating engine 110 compared the processed image 320 with the real images 340, 350 and 360, operation S430 is executed. In operation S430, the discriminator of the image generating engine 110 determines whether a comparison result is lower than a threshold. In some embodiments, the threshold is set based on the loss function in the GAN model, in order to determine whether the processed image 320 is sufficiently similar to the real images 340, 350 and 360. In an embodiment, the comparison result is represented by the output values of the loss function in the GAN model. If the comparison result includes fewer differences, the loss function outputs a lower value. If the comparison result includes more differences, the loss function outputs a higher value. The threshold can be set to a low value indicating that the target image is sufficiently similar to the real image when the output of the loss function is lower than this value.

If the processed image 320 is sufficiently similar (i.e., the comparison result includes fewer differences, and the output of the loss function is lower than the threshold.) to the real images 340, 350 and 360, the training of the image generating engine 110 is terminated (completed). In other words, the generator of the image generating engine 110 training stage is completed. On the other hand, if the processed image 320 is not sufficiently similar (i.e., the comparison result includes more differences, and the output of the loss function is higher than the threshold.) to the real images 340, 350 and 360, the operation S440 is executed.

In operation S440, the image generating engine 110 will be updated, and the updated image generating engine 110 will generate a processed image again (i.e., the operation S410), in which the processed image 320 is updated, according to the comparison result and continues to compare the updated processed image with the real images 340, 350 and 360 (i.e., the operation S420). In operation s440, both the generator and the discriminator of the image generating engine 110 are updated. The updated generator can generate the updated processed image (e.g., the target image 330), which is more similar to the real images 340, 350 and 360, and the updated discriminator can have a better discriminative capability so that the generator is forced to generate more realistic images to fool the discriminator.

Figure 5:
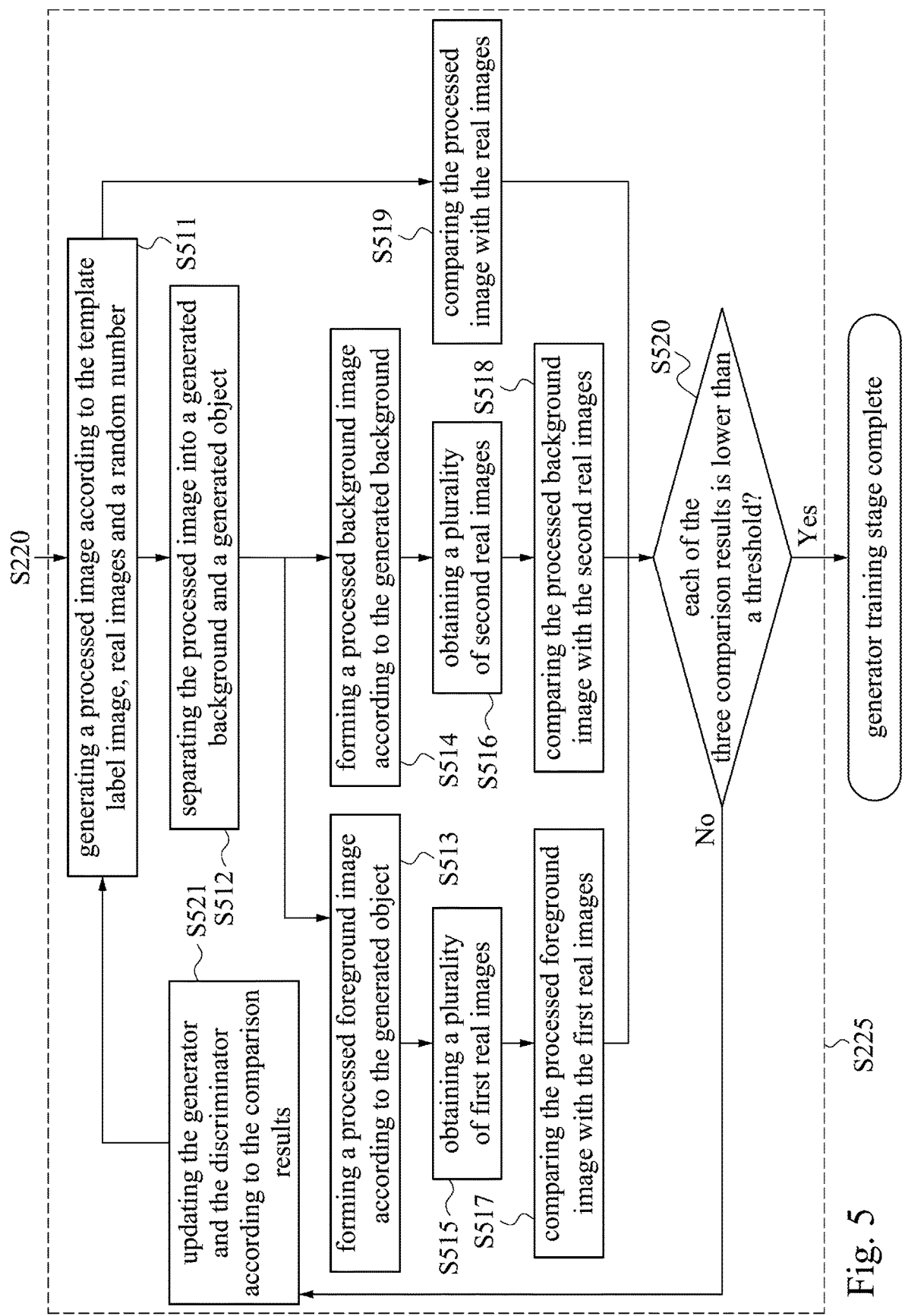
FIG. 5 is a partial flowchart of an image processing method of the image processing system in FIG. 1, in accordance with one embodiment of the present disclosure.

In another embodiment, the operation S225 in FIG. 2 includes different operations as shown in FIG. 5. FIG. 5 is a partial flowchart of an image processing method 200 in FIG. 2, in accordance with one embodiment of the present disclosure. Compared with the operations in FIG. 4, the operations in FIG. 5 can further prevent the color or the texture of the generated background 332 from being filled to the generated object 331, and prevent the color or the texture of the generated object 331 from being filled to the generated background 332.

Reference is made to FIG. 1, FIG. 5 and FIGS. 6A-6D. FIGS. 6A-6D are schematic diagrams illustrating the operation S225 of the image processing method 200 in a demonstrative example.

Figure 6A:
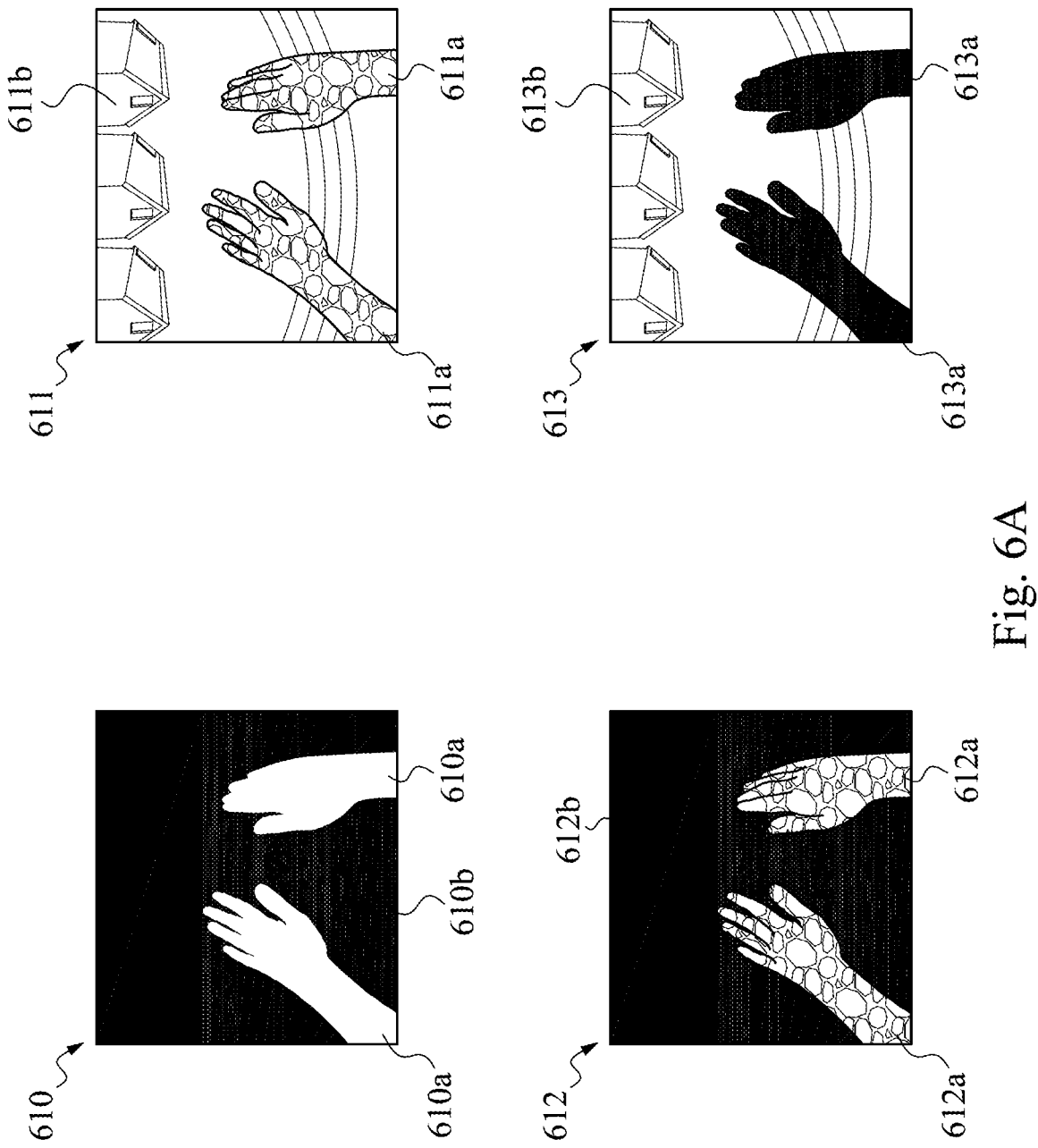
FIGS. 6A-6D are schematic diagrams illustrating the image processing method in a demonstrational example.
Figure 6B:
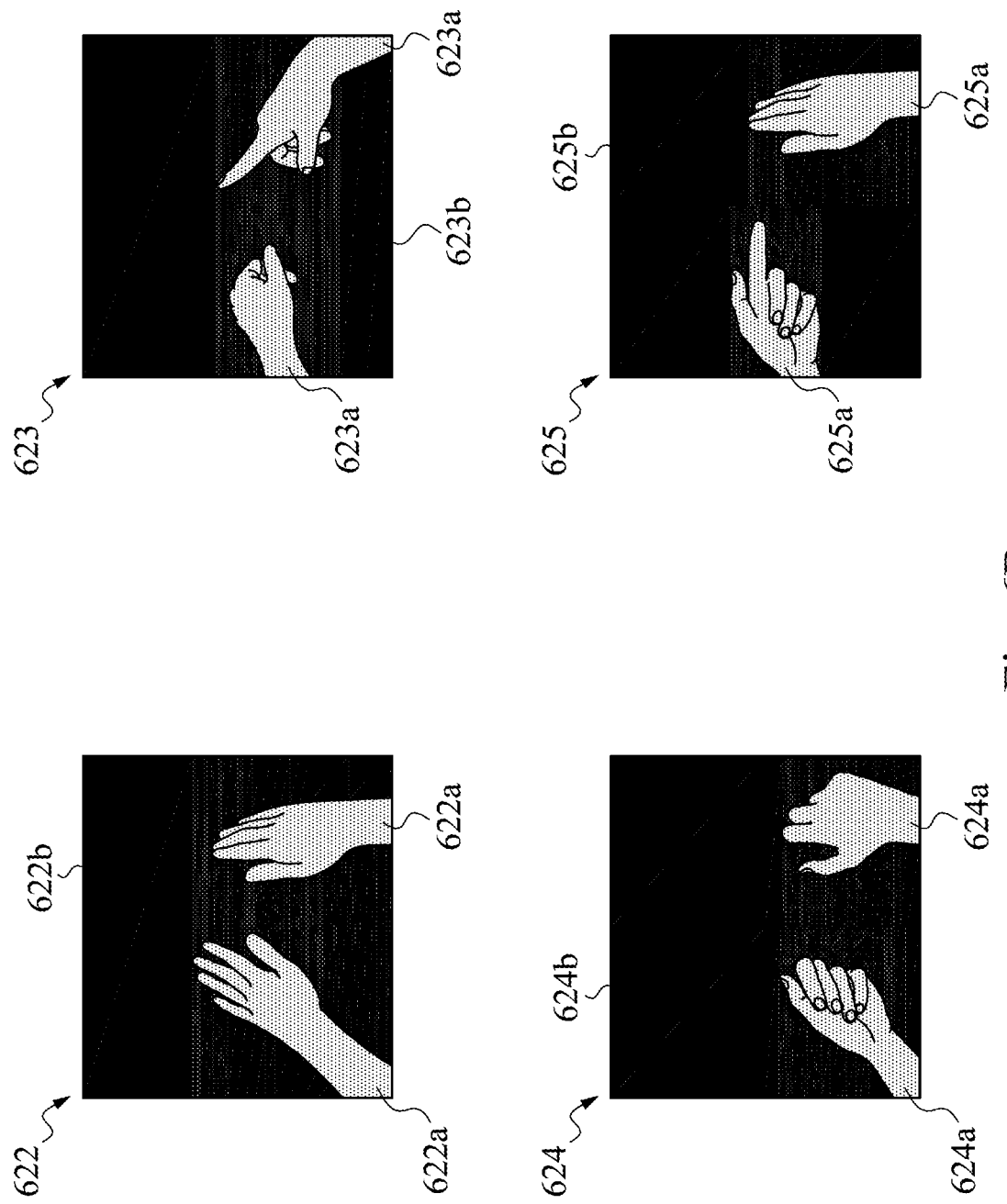
Figure 6C:
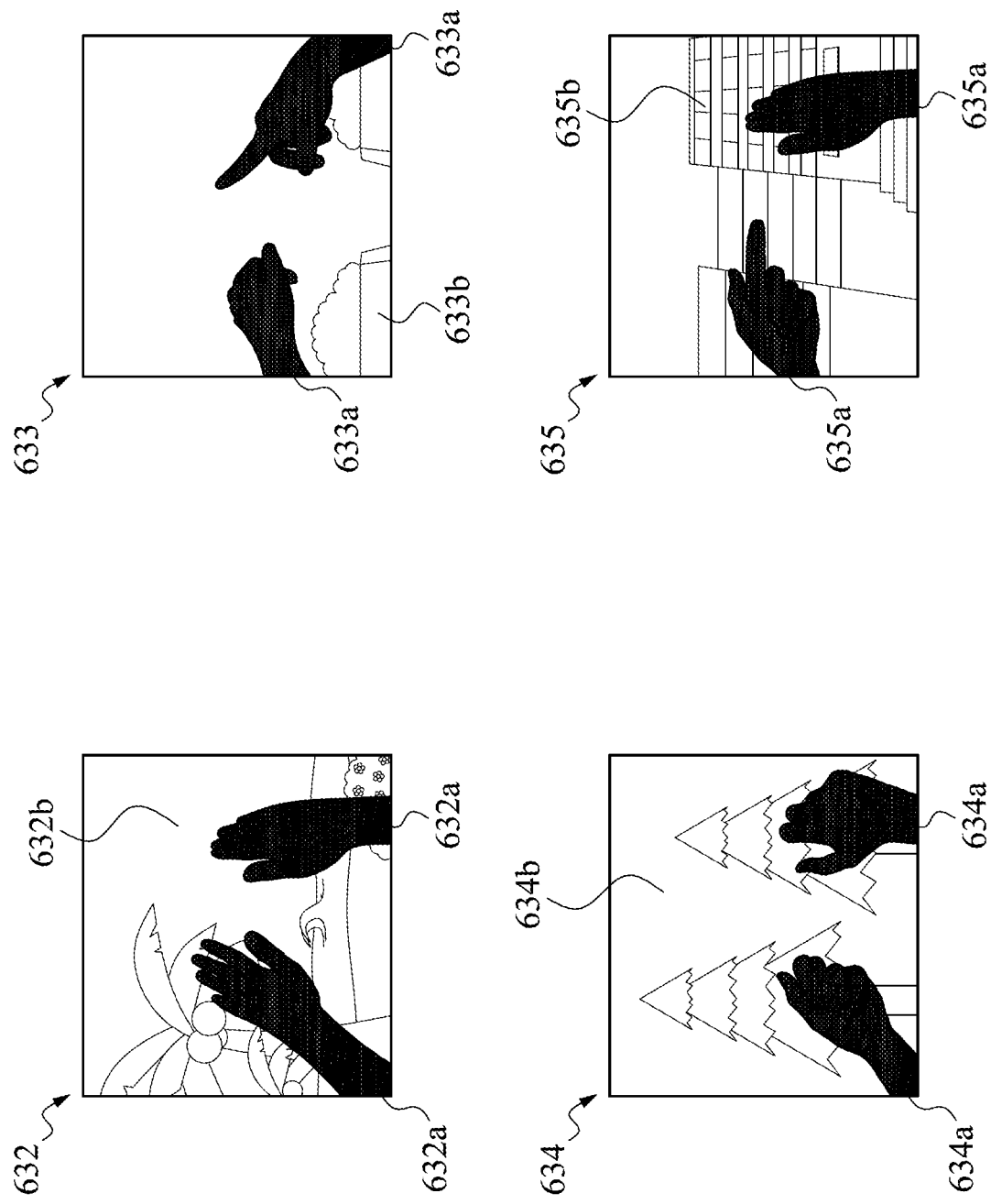
Figure 6D:
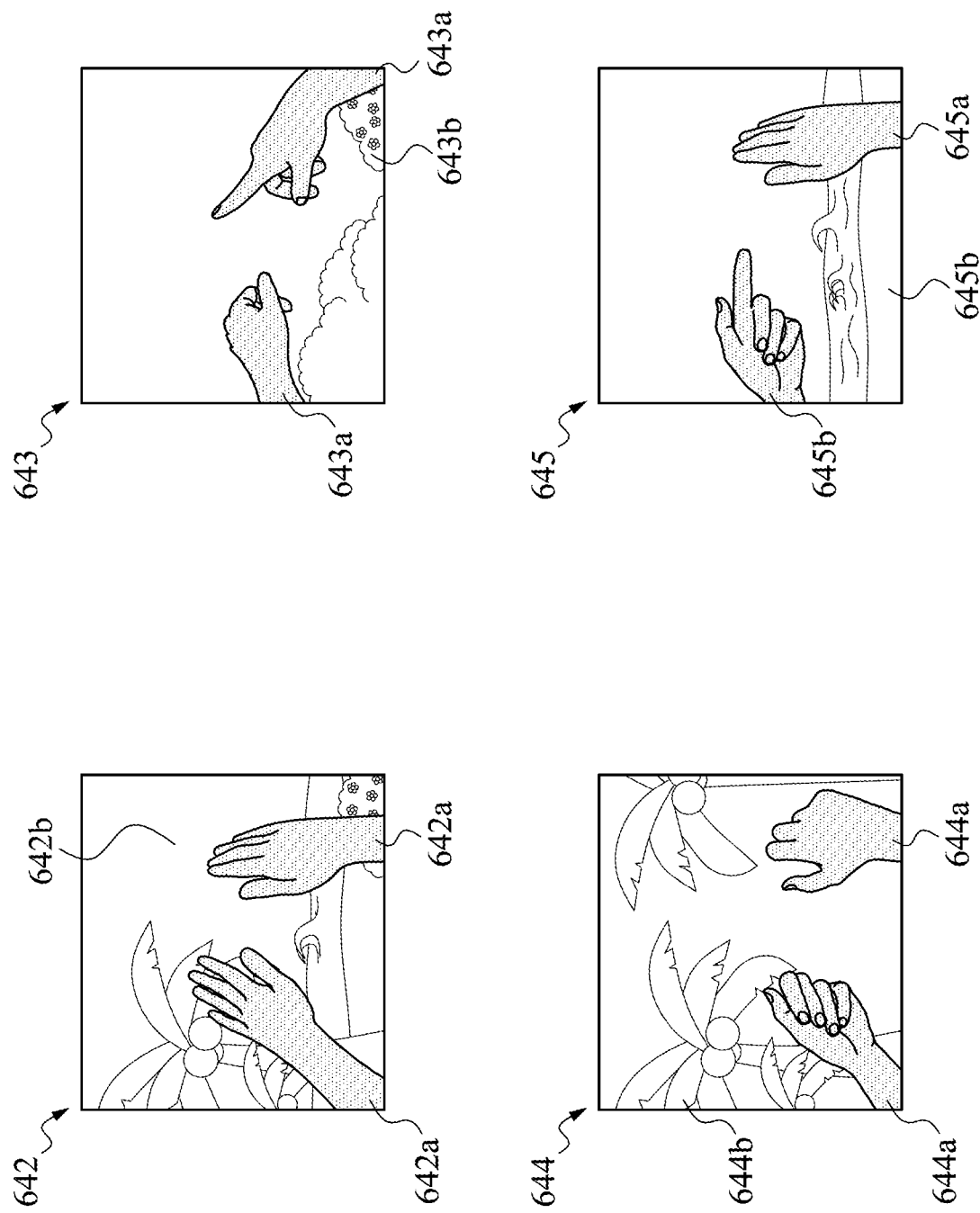

In operation S511, the generator of the image generating engine 110 generates a processed image 611 (as shown in FIG. 6A) according to the template label image 610 (as shown in FIG. 6A), real images 643, 644 and 645 (as shown in FIG. 6D) and a random number. In some embodiments, the template label image 610 includes the first label 610a and the second label 610*b*, in which the first label 610*a* is an area inside the object contour of the target (i.e., the hands).

In some embodiments, the random number is supplied to the generator of the image generating engine 110 in order to generate different processed image 611 with the same template label image 610 and the same real images 643, 644 and 645.

In operation S512, the image generating engine 110 separates the processed image 611 into the generated background 611*b* and the generated object 611*a*, in which the generated background 611*b* includes upside down houses and upside down rainbow, and the generated object 611*a* includes hands filled with the texture of roads. After the operation S512 is executed, the operations S513 and S514 are simultaneously executed thereafter.

In operation S513, the image generating engine 110 forms the processed foreground image 612 (as shown in FIG. 6A) according to the generated object 611*a* in the processed image 611, in which the processed foreground image 612 includes the first generated object 612*a* with the same color, texture and shape of the generated object 611*a* in the processed image 611, and the first generated background 612*b* with the black color (or other single color, such as dark blue, dark brown or other colors). After the operation S513 is executed, the operation S515 is then executed.

In operation S515, the image generating engine 110 obtains the plurality of reference images (e.g., first real images 623/624/625 captured by a camera as shown in FIG. 6B). In some embodiments, the reference images can be first real images 623/624/625 captured by a camera. For example, the first real images 623/624/625 are filmed by a photographer regarding a real scene, or collected from an image database.

In some embodiments, each of the first real images 623, 624 and 625 contains first object image data 623*a*/624*a*/625*a* corresponding to the target (i.e., the hands) with chromatic colors and first background image data 623*b*/624*b*/625*b* with a black color. For example, as shown in FIG. 6B, the first real image 623 contains first object image data 623*a* (i.e., hands) with a beige color and first background image data 623*b* with a black color, the first real image 624 contains first object image data 624*a* (i.e., hands) with a dark brown color and first background image data 624*b* with a black color, and the first real image 625 contains first object image data 625*a* (i.e., hands) with a white color and first background image data 625*b* with a black color.

In some embodiments, the first real images 623, 624 and 625 can be obtained in the following steps: recording hands waving in front of a black screen as a video streaming, and taking a plurality snapshot of photos (i.e., the first real images 623, 624 or 625) from the video streaming. After the operation S515 is executed, the operation S517 is then executed.

In operation S517, the discriminator of the image generating engine 110 compares the processed foreground image 612 with the first real images 623, 624 and 625 as a first comparison result. In detail, the discriminator of the image generating engine 110 determines whether the processed foreground image 612 is sufficiently similar to the first real images 623, 624 and 625. After the operation S517 is executed, the operation S520 is then executed to determine whether the first comparison result is lower than a threshold.

In operation S514, the image generating engine 110 forms a processed background image 613 (as shown in FIG. 6A) according to the generated background 611*b* in the processed image 611, in which the processed background image 613 includes the second generated object 613*a* with a black color, and the second generated background 613*b* with the same color, texture and shape of the generated background 611*b* in the processed image 611. The operation S514 is executed, followed by the operation S516.

In operation S516, the image generating engine 110 obtains a plurality of reference images (e.g., second real images 633/634/635 captured by a camera as shown in FIG. 6C). In some embodiments, third reference images can be the second real images 633/634/635 captured by a camera. For example, the second real images 633/634/635 are filmed by a photographer regarding a real scene, or collected from an image database.

In some embodiments, each of the second real images 633, 634 and 635 contains the second object image data 633*a*/634*a*/635*a* corresponding to the target (i.e., hands) with a black color (or other single color, such as dark blue, dark brown or other colors) and the second background image data 633*b*/634*b*/635*b* with chromatic colors. For example, as shown in FIG. 6C, the second real image 633 contains the second object image data 633*a* (i.e., hands) with a black color and the second background image data 633*b* (i.e., groves) with chromatic colors, the second real image 634 contains the second object image data 634*a* (i.e., hands) with a black color and the second background image data 634*b* (i.e., trees) with chromatic colors, and the second real image 635 contains the second object image data 635*a* (i.e., hands) with a black color and the second background image data 635*b* (i.e., buildings) with chromatic colors.

In some embodiments, the second real images 633, 634 and 635 can be obtained in the following steps: putting a black paper having hands shapes in front of a camera and taking photos by the camera. Another example of obtaining the second real images 633, 634 and 635 includes the following steps: taking photos without hands, synthesizing black hands and the photos by a computer to form the second real images 633, 634 and 635.

In operation S518, the discriminator of the image generating engine 110 compares the processed background image 613 with the second real images 633, 634 and 635 as the second comparison result. In detail, the discriminator of the image generating engine 110 determines whether the processed background image 613 is sufficiently similar to the second real images 633, 634 and 635. After the operation S518 is executed, the operation S520 is then executed to determine whether the second comparison result is lower than the threshold.

In operation S519, the discriminator of the image generating engine 110 compares the processed image 611 with the real images 643, 644 and 645 as the third comparison result. In detail, the discriminator of the image generating engine 110 determines whether the processed image 611 is sufficiently similar to the real images 643, 644 and 645. After the operation S519 is executed, the operation S520 is then executed to determine whether the third comparison result is lower than the threshold.

In operation S520, the discriminator of the image generating engine 110 determines whether all of the first comparison result, the second comparison result and the third comparison result are lower than the threshold. In some embodiments, the threshold is set based on the loss function in the GAN model, in order to determine whether the processed foreground image 612 is sufficiently similar to the first real images 623, 624 and 625, determine whether the processed background image 613 is sufficiently similar to the second real images 633, 634 and 635, and determine whether the processed image 611 is sufficiently similar to the real images 643, 644 and 645. In an embodiment, the comparison result is represented by the output values of the loss function in the GAN model. If the comparison result includes fewer differences, the loss function outputs a lower value. If the comparison result includes more differences, the loss function outputs a higher value. The threshold can be set to a low value indicating that the target image is sufficiently similar to the real image when the output of the loss function is lower than this value.

About the first comparison result, for example, as shown in FIG. 6B, the discriminator of the image generating engine 110 may learn the color of the first generated object 612*a* which cannot be the color of roads (i.e., gray) based on the color of first object image data 623*a* (i.e., beige), the color of first object image data 624*a* (i.e., dark brown), and the color of first object image data 625*a* (i.e., white). Therefore, the discriminator of the image generating engine 110 determines the processed foreground image 612 as a fake image since the color of the first generated object 612*a* cannot be gray. Consequently, the first comparison result is higher than the threshold.

About the second comparison result, for example, as shown in FIG. 6C, the discriminator of the image generating engine 110 may learn the content of the second generated background 613*b* which cannot be houses set upside down and rainbow presented upside down (i.e., stand from the top of an image) since the content of the second background image data 633*b*. The content of the second background image data 634*b* and the content of the second background image data 635*b* teach the generator of the image generating engine 110 that the content are all stand from the bottom of an image. Therefore, the discriminator of the image generating engine 110 determines the processed background image 613 as a fake image since the content of the second generated background 613*b* cannot include an upside down rainbow and upside down houses. Consequently, the second comparison result is higher than the threshold.

About the third comparison result, for example, as shown in FIG. 6D, since the real image 643 contains the object image data 643*a* (i.e., hands with a beige color) and background image data 643*b* (i.e., shrubs), the real image 644 contains the object image data 644*a* (i.e., hands with a dark brown color) and background image data 644*b* (i.e., coco palms), the real image 645 contains the object image data 645*a* (i.e., hands with a white color) and background image data 645*b* (i.e., waves), the discriminator may determine that the processed image 611 is a fake image since the texture of the generated object 611*a* is the same as the road instead of a real hand, and the content of the generated background 611*b* is unreasonable. Consequently, the third comparison result is higher than the threshold.

In some embodiments, when all of the first comparison result, the second comparison result and the third comparison result are lower than the threshold, the training stage of the generator of the image generating engine 110 is completed. In some embodiments, in response to at least one of the first comparison result, the second comparison result and the third comparison result is higher than the threshold, the operation S521 is executed to update both the generator and discriminator of the image generating engine 110 and the processed image 611 is updated.

In one embodiment, in response to the first comparison result that is higher than a threshold, the processed image 611 is updated according to the first comparison result. In one embodiment, in response to the second comparison result that is higher than the threshold, the processed image 611 is updated according to the second comparison result. In one embodiment, in response to the third comparison result that is higher than the threshold, the processed image 611 is updated according to the second comparison result.

In practical, when the discriminator of the image generating engine 110 does not regard the processed image 611 as a real image captured by a camera, the generator of the image generating engine 110 is updated and generates a new processed image 611, and the discriminator is updated to have a better discriminative capability so that the generator is forced to generate more realistic images to fool the discriminator.

In some embodiments, after times of updating the generator of the image generating engine 110, as shown in FIG. 6D, the generator of the image generating engine 110 generates a processed image 642 including the generated object 642*a* with a beige color and the generated background 642*b* with palms, shrubs and waves in operation S511. The image generating engine 110 then separates the processed image 642 into the generated background 642*b* and the generated object 642*a* in operation S512. The image generating engine 110 then forms the processed foreground image 622 and the processed background image 632 in the operation S513 and S514 respectively. The discriminator of the image generating engine 110 compares the processed foreground image 622 with the first real images 623, 624 and 625, compares the processed background image 632 with the second real images 633, 634 and 635, and compares the processed image 642 with the real images 643, 644 and 645 in the operation S517, S518 and S519 separately. The discriminator of the image generating engine 110 then determines that all of the first comparison result, the second comparison result and the third comparison result are lower than the threshold in operation S520. In other words, the processed foreground image 622 is sufficiently similar to the first real images 623, 624 and 625, the processed background image 632 is sufficiently similar to the second real images 633, 634 and 635, and the processed image 642 is sufficiently similar to the real images 643, 644 and 645. Then, the generator of the image generating engine 110 training stage is completed and the operation S230 is executed to generate a target image by the trained generator, in which the target image is the processed image 642.

Through the determination mechanism in operation S520, it can be ensured that the processed image 642 is not distorted. In details, the operation S520 is utilized to avoid the color or the texture of the generated background 642*b* being filled into the generated object 642*a*, and avoid the color or the texture of the generated object 642*a* being filled into the generated background 642*b*.

In some embodiments, a template label image may contain more than one object contour, for example, the template label image may contain three object contours of three targets (e.g., hand, pen and book), in which a color of an area within each of the three object contours can be shown in red, green and blue respectively, and a color of the background is black. In detail, the area within the first object contour consists of red pixels, the area within the second object contour consists of green pixels, the area within the third object contour consists of blue pixels, and the rest area consists of black pixels. In order to generate an image which is similar to a real image and contains three targets, the image generating engine 110 can use the image processing method 200 to generate a target image which meets the above conditions. The detailed steps of the image processing method 200 applied to the template label image with three targets are shown below.

In one embodiment, when the operation S225 in the image processing method 200 is replaced with the operations in FIG. 4. First, the image generating engine 110 obtains a template label image which contains three object contours of three targets, obtains real images which contains object image data corresponding to the three targets, generates a processed image according to the template label image and the real images. Then the image generating engine 110 compares the processed image with the real images, updates the processed image when the comparison result is higher than a threshold, outputs the updated processed image as the target image in response to the comparison result is lower than the threshold, and trains the image processing model 120 with the target image and the template label image.

In another embodiment, when the operation S225 in the image processing method 200 is replaced with the operations in FIG. 5. First, the image generating engine 110 obtains a template label image which contains three object contours of three targets, the generator of the image generating engine 110 generates a processed image according to the template label image, real images and a random number, and then the processed image is separated into three generated objects (i.e., generated object corresponding to hands, generated object corresponding to a pen, and generated object corresponding to a book) and a generated background, and then formed three processed foreground images (i.e., first processed foreground image, second processed image and third processed image) according to the generated object corresponding to hands, the generated object corresponding to a pen, and the generated object corresponding to a book respectively, and a processed background image corresponding to the background.

Then, five types of real images (i.e., first real images, second real images, third real images, fourth real images and real images) are obtained. For example, each of the first real images contains first object image data corresponding to first target (i.e., hands) with chromatic colors and first background image data with a black color, each of the second real images contains second object image data corresponding to second target (i.e., pen) with chromatic colors and second background image data with a black color, each of the third real images contains third object image data corresponding to third target (i.e., book) with chromatic colors and third background image data with a black color, each of the fourth real images contains fourth object image data corresponding to the three targets (i.e., hands, pen and book) with a black color and fourth background image data with chromatic colors, and each of the real images contains object image data corresponding to the three targets (i.e., hands, pen and book) and a background with chromatic colors. Each of the first processed foreground image consists of a first generated object corresponding to the first target with chromatic colors and a first generated background with a black color, each of the second processed foreground image consists of a second generated object corresponding to the second target with chromatic colors and a second generated background with a black color, each of the third processed foreground image consists a third generated object corresponding to the third target with chromatic colors and a third generated background with a black color, and each of the processed background image consists of a fourth generated object corresponding to the three targets with a black color and a fourth generated background with chromatic colors, and each of the real images consists of a hand, a pen, a book, and a rest area with chromatic colors. Then the first real images, the second real images, the third real images, the fourth real images and the real images are compared with their corresponding processed images.

Figure 7:
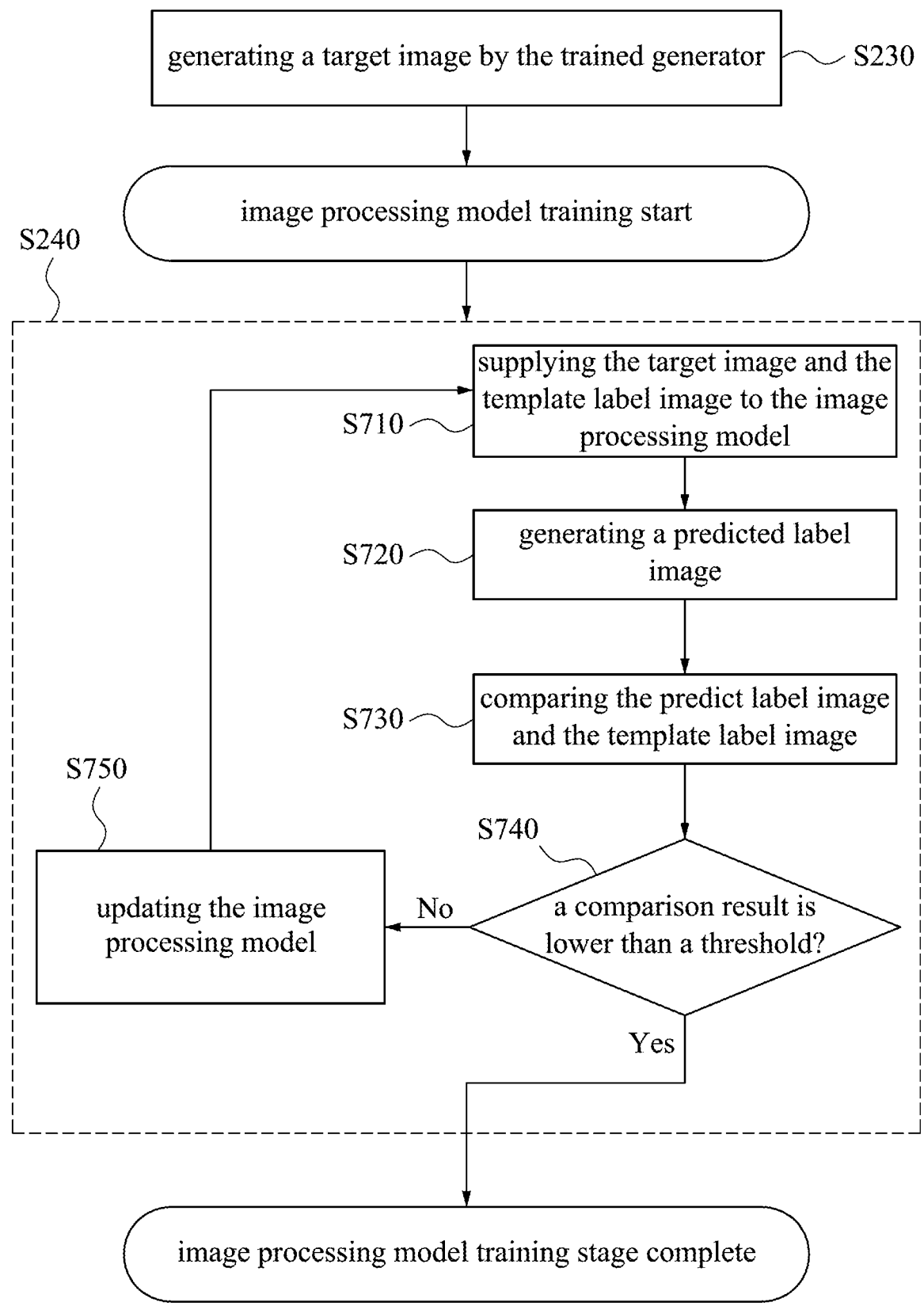
FIG. 7 is a partial flowchart of an image processing method in FIG. 2, in accordance with one embodiment of the present disclosure.

FIG. 7 is a partial flowchart illustrating further operations within the operation S240 in an image processing method 200 in FIG. 2, in accordance with one embodiment of the present disclosure.

After the trained generator of the image generating engine 110 generates the target image 330 (e.g., the processed image 642 can also be regarded as a target image) according to the template label image 310 (or template label image 610), the training stage of the image processing model 120 starts.

In operation S710, a pair of the target image 330 (or the processed image 642) and the template label image 310 (or template label image 610) is supplied to the image processing model 120, in which the labels of the target image 330 (or the processed image 642) are the same as the labels in the template label image 310 (or template label image 610).

In operation S720, the processor (not shown) of the image processing model 120 generates a predicted label image (not shown) according to the target image 330 (or the processed image 642).

In operation S730, the processor (not shown) of the image processing model 120 compares the predicted label image (not shown) with the template label image 310 (or template label image 610).

In operation S740, the processor (not shown) of the image processing model 120 determines whether a comparison result is lower than a threshold. When the comparison result is higher than the threshold, the operation S750 is executed. When the comparison result is lower than the threshold, i.e. the predicted label image (not shown) is sufficiently similar to the template label image 310 (or template label image 610), such that the image processing model 120 training stage is completed.

In operation S750, the image processing model 120 is updated according to the comparison result obtained in the operation S730.

In detail, the image processing model 120 is trained by estimating the differences between the predicted label image (not shown) and the given template label image 310 (or template label image 610), and further updating the predicted label image (not shown) to approximate the template label image 310 (or template label image 610).

Figure 8:
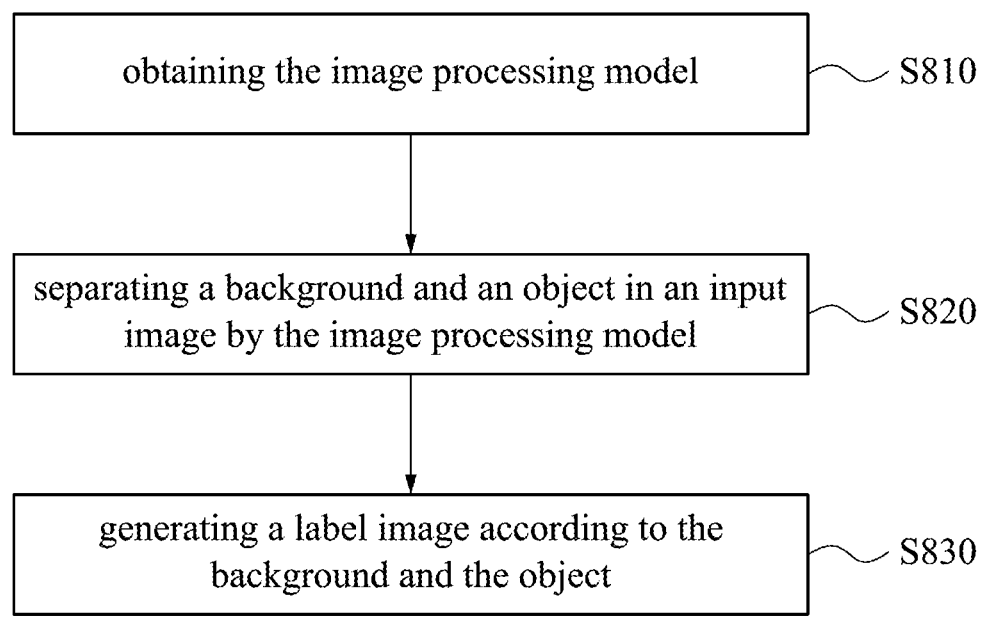
FIG. 8 is a partial flowchart of an image processing method of the image processing system in FIG. 1, in accordance with one embodiment of the present disclosure.

In some embodiments, after the image processing model 120 is trained, an object of the input image can be separated from its background by the image processing model 120 whose the detailed operations are discussed with FIG. 8.

Figure 9:
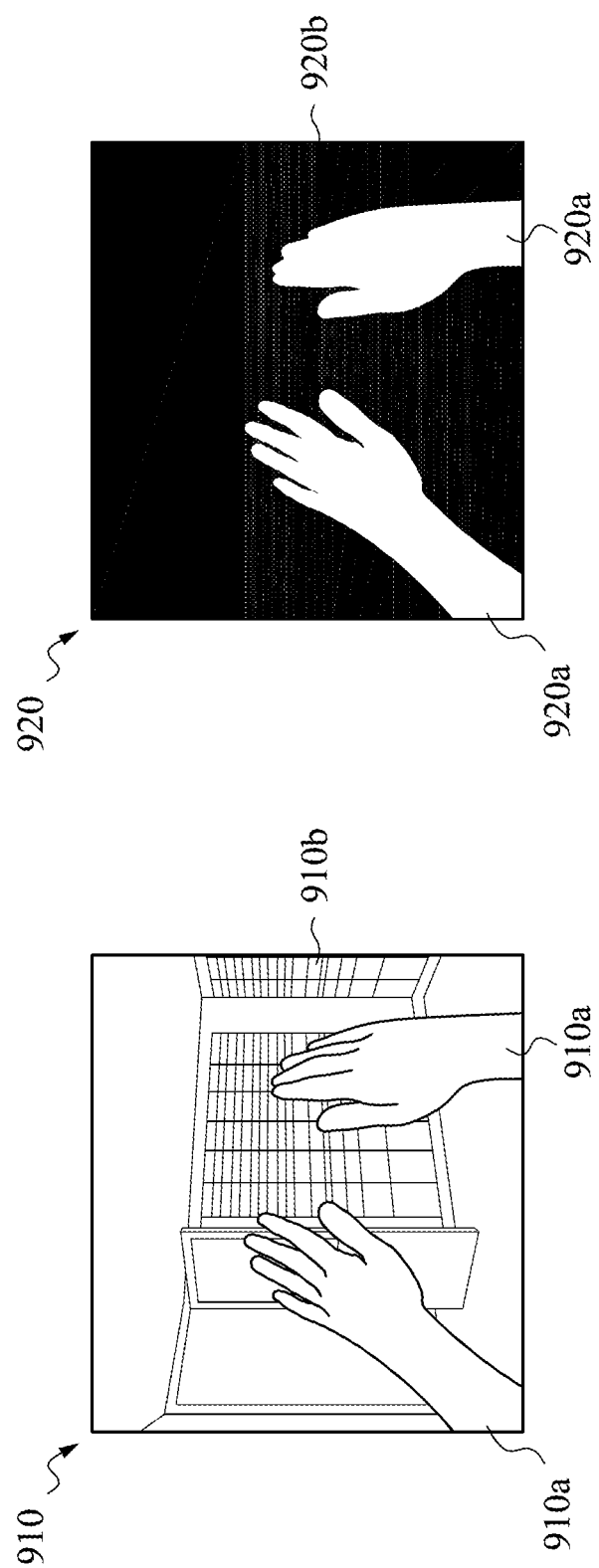
FIG. 9 is a schematic diagram illustrating the image processing method in a demonstrational example.

Reference is made to FIG. 8 and FIG. 9. FIG. 8 is a partial flowchart of an image processing method 800 of the image processing system 100 in FIG. 1, in accordance with one embodiment of the present disclosure. FIG. 9 is a schematic diagram illustrating the image processing method 800 in a demonstrative example.

In operation S810, the image processing model 120 is obtained. In this operation, an input image 910 is supplied to the image processing model 120 in order to acquire a label image (i.e., a label image 920).

In operation S820, the image processing model 120 separates the object 910a from the background 910b in the input image 910.

In operation S830, the image processing model 120 generates a label image 920 according to the background 910b and the object 910a of the input image 910, in which the label image 920 contains the first label 920a related to the object 910a (e.g., hands) with the first color (e.g., white) and the second label 920b related to the background 910b with the second color (e.g., black).

Figure 10:
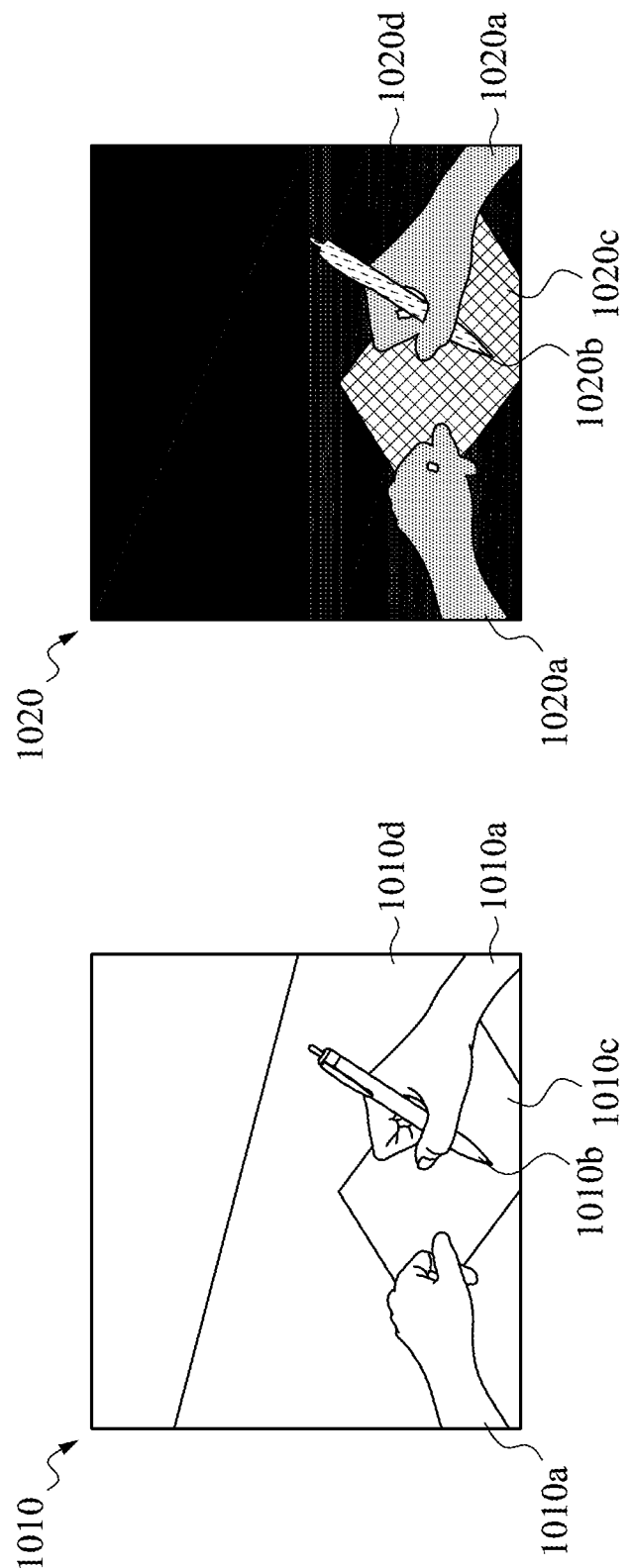
FIG. 10 is a schematic diagram illustrating the image processing method in a demonstrational example.

Reference is made to FIG. 10, in which FIG. 10 is a schematic diagram illustrating the image processing method 800 in a demonstrative example. As shown in FIG. 10, the input image 1010 consists of a first object 1010*a* (i.e., a hand), a second object 1010*b* (i.e., a pen), a third object 1010*c* (i.e., a book) and a background 1010*d* (i.e., roads).

In one embodiment, after the image processing model 120 is trained by the template label images and the target images obtained from the image generating engine 110, the input image 1010 supplied to the image processing model 120 can be separated into the background 1010*d*, the first object 1010*a*, the second object 1010*b* and the third object 1010*c*, and the label image 1020 can be generated according to the first object 1010*a*, the second object 1010*b*, the third object 1010*c* and the background 1010*d*, in which the label image 1020 contains the first label 1020*a* related to the first object 1010*a* (e.g., hand) with the first color (e.g., red), the second label 1020*b* related to the second object 1010*b* (e.g., pen) with the second color (e.g., green), the third label 1020*c* related to the third object 1010*c* (e.g., book) with the third color (e.g., blue), the fourth label 1020*d* related to the background 1010*d* with the fourth color (e.g., black).

In summary, by using the image processing system 100, a large volume of pixel-wise labeled image can be automatically generated to achieve high accuracy when doing the task of object segmentation or segmenting an object out of an image.

Another embodiment of disclosure includes a non-transitory computer readable storage medium (e.g., the memory 140 shown in FIG. 1, a hard drive, or any equivalent storage unit) with a computer program to execute aforesaid image processing method 200 and/or 800 shown in FIG. 2, FIG. 4, FIG. 7 and FIG. 8 respectively.

Although the present disclosure has been described in considerable details with reference to certain embodiments thereof, other embodiments are possible. Therefore, the scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image processing method comprising:
obtaining a template label image, wherein the template label image comprises a label corresponding to a target;
obtaining a plurality of first reference images, wherein each of the first reference images comprises object image data corresponding to the target; and
generating a target image according to the template label image and the first reference images, wherein the target image comprises a generated object, a contour of the generated object is generated according to the template label image, and a color or a texture of the target image is generated according to the first reference images, wherein the target image and the template image are used for training an image processing model, and wherein the image processing model after training is configured to process an input image without labels for generating a label image related to the input image.

2. The image processing method as claimed in claim 1, further comprising:
obtaining a background and an object in the input image by the image processing model; and
generating the label image according to the background and the object, wherein the label image comprises a first label related to the object and a second label related to the background.

3. The image processing method as claimed in claim 1, wherein before generating the target image, the image processing method further comprises:
training an image generating engine, wherein the image generating engine is utilized to generate the target image.

4. The image processing method as claimed in claim 3, wherein the operation of training the image generating engine comprises:
generating a processed image according to the template label image and the first reference images;
comparing the processed image with the first reference images; and
in response to whether a comparison result is higher than a threshold, updating the processed image or terminating the training of the image generating engine.

5. The image processing method as claimed in claim 4, further comprising:
in response to the comparison result is higher than the threshold, updating the processed image according to the comparison result and comparing the updated processed image with the first reference images until the comparison result is lower than the threshold; and
in response to the comparison result is lower than the threshold, terminating the training of the image generating engine.

6. The image processing method as claimed in claim 4, wherein the operation of comparing the processed image with the first reference images comprises:
comparing a color, a texture or a content-object shape of the processed image with the first reference images.

7. The image processing method as claimed in claim 3, wherein the operation of training the image generating engine comprises:
generating a processed image according to the template label image and the first reference images;
generating a generated background and a generated object based on the processed image;
forming a processed foreground image according to the generated object;
obtaining a plurality of second reference images, wherein each of the second reference images comprises first object image data corresponding to the target with chromatic colors and first background image data with a single color;
comparing the processed foreground image with the second reference images as a first comparison result; and
updating the processed image according to whether the first comparison result is higher than a threshold.

8. The image processing method as claimed in claim 7, wherein the operation of training the image generating engine further comprises:
forming a processed background image according to the generated background;
obtaining a plurality of third reference images, wherein each of the third reference images comprises second object image data corresponding to the target with the single color and second background image data with chromatic colors;
comparing the processed background image with the third reference images as a second comparison result; and
updating the processed image according to whether the second comparison result is higher than the threshold.

9. The image processing method as claimed in claim 8, wherein the operation of training the image generating engine further comprises:
- comparing the processed image with the first reference images as a third comparison result;
- in response to the third comparison result is higher than the threshold, updating the processed image according to the third comparison result; and
- terminating the training of the image generating engine according to all of the first comparison result, the second comparison result and the third comparison result are lower than the threshold.

10. The image processing method as claimed in claim 1, wherein the target image is generated by a generative adversarial network (GAN) model, and training data of the GAN model comprises the template label image and the first reference images.

11. A non-transitory computer readable storage medium storing one or more programs comprising instructions, which when executed, causes one or more processing components to perform the image processing method as claimed in claim 1.

12. An image processing system comprising:
- a memory configured to store a template label image, wherein the template label image comprises a label corresponding to a target; and
- a processor coupled to the memory and being operable to:
  - obtain a plurality of first reference images, wherein each of the first reference images comprises object image data corresponding to a target; and
  - generate a target image according to the template label image and the first reference images, wherein the target image comprises a generated object, a contour of the generated object is generated according to the template label image, and a color or a texture of the target image is generated according to the first reference images, wherein the target image and the template label image are used for training an image processing model, and the image processing model after training is configured to process an input image without labels for generating a label image related to the input image.

13. The image processing system as claimed in claim 12, wherein the processor is further operable to:
- obtain a background and an object in the input image by the image processing model; and
- generate the label image according to the background and the object, wherein the label image comprises a first label related to the object and a second label related to the background.

14. The image processing system as claimed in claim 12, wherein the processor is further operable to:
- train an image generating engine before generating the target image, wherein the image generating engine is utilized to generating the target image;
- generate a processed image according to the template label image and the first reference images;
- compare the processed image with the first reference images; and
- in response to whether a comparison result is higher than a threshold, update the processed image or terminate the training of the image generating engine.

15. The image processing system as claimed in claim 14, further comprising:
- in response to the comparison result is higher than the threshold, updating the processed image according to the comparison result and comparing the updated processed image with the first reference images until the comparison result is lower than the threshold; and
- in response to the comparison result is lower than the threshold, terminating the training of the image generating engine.

16. The image processing system as claimed in claim 14, wherein the processor is further operable to:
- compare a color, a texture or a content-object shape of the processed image with the first reference images.

17. The image processing system as claimed in claim 12, wherein the processor is further operable to:
- train an image generating engine before generating the target image, wherein the image generating engine is utilized to generating the target image;
- generate a processed image according to the template label image and the first reference images;
- generate a generated background and a generated object based on the processed image;
- form a processed foreground image according to the generated object;
- obtain a plurality of second reference images, wherein each of the second reference images comprises first object image data corresponding to the target with chromatic colors and first background image data with a single color;
- compare the processed foreground image with the second reference images as a first comparison result; and
- update the processed image according to whether the first comparison result is higher than a threshold.

18. The image processing system as claimed in claim 17, wherein the processor is further operable to:
- form a processed background image according to the generated background;
- obtain a plurality of third reference images, wherein each of the third reference images comprises second object image data corresponding to the target with a single color and second background image data with chromatic colors;
- compare the processed background image with the third reference images as a second comparison result; and
- update the processed image according to whether the second comparison result is higher than the threshold.

19. The image processing system as claimed in claim 18, wherein the processor is further operable to:
- compare the processed image with the first reference images as a third comparison result;
- in response to the third comparison result is higher than the threshold, update the processed image according to the third comparison result; and
- terminate the training of the image generating engine according to all of the first comparison result, the second comparison result and the third comparison result are lower than the threshold.

20. The image processing system as claimed in claim 12, wherein the target image is generated by a generative adversarial network (GAN) model and training data of GAN model comprises the template label image and the first reference images.

* * * * *